(12) United States Patent
Micka et al.

(10) Patent No.: US 6,189,079 B1
(45) Date of Patent: Feb. 13, 2001

(54) DATA COPY BETWEEN PEER-TO-PEER CONTROLLERS

(75) Inventors: William Frank Micka, Tucson, AZ (US); Yoram Novick, Haifa (IL)

(73) Assignee: International Business Machines Corporation, Armonk, NY (US)

(*) Notice: Under 35 U.S.C. 154(b), the term of this patent shall be extended for 0 days.

(21) Appl. No.: 09/083,750

(22) Filed: May 22, 1998

(51) Int. Cl.[7] ............... G06F 12/06; G06F 12/00
(52) U.S. Cl. ................... 711/162; 711/161; 711/5
(58) Field of Search .................. 711/161, 162, 711/5, 114

(56) References Cited

U.S. PATENT DOCUMENTS

| | | | |
|---|---|---|---|
| 5,175,849 | 12/1992 | Schneider | 707/202 |
| 5,404,502 | 4/1995 | Warner et al. | 714/20 |
| 5,418,945 | 5/1995 | Carter et al. | 707/8 |
| 5,440,735 | 8/1995 | Goldring | 707/8 |
| 5,497,483 | 3/1996 | Beardsley et al. | 714/1 |
| 5,530,939 | 6/1996 | Mansfield, Jr. et al. | 707/201 |
| 5,537,533 | 7/1996 | Staheli et al. | 714/5 |
| 5,544,347 | 8/1996 | Yanai et al. | 711/162 |
| 5,603,024 | 2/1997 | Goldring | 707/203 |
| 5,613,113 | 3/1997 | Goldring | 707/202 |
| 5,692,155 | * 11/1997 | Iskiyan et al. | 711/162 |
| 5,809,516 | * 9/1998 | Ukai et al. | 711/114 |
| 5,835,954 | * 11/1998 | Duyanovich et al. | 711/162 |
| 5,875,479 | * 2/1999 | Blount et al. | 711/162 |
| 5,909,700 | * 6/1999 | Bitner et al. | 711/162 |

FOREIGN PATENT DOCUMENTS

| | | |
|---|---|---|
| 0672984 | 1/1995 | (EP) . |
| 0778692 | 9/1996 | (EP) . |

OTHER PUBLICATIONS

Concurrent Copy; IBM Technical Disclosure Bulletin, vol. 37, No. 4B, Apr. 1994.*

Efficient Management of Remote Disk Subsystem Data duplexing; IBM Technical Disclosure Bulletin, vol. 39, No. 1, Jan. 1996.

* cited by examiner

Primary Examiner—John W. Cabeca
Assistant Examiner—Brian R. Peugh
(74) Attorney, Agent, or Firm—David W. Victor; Konrad Raynes & Victor LLP

(57) ABSTRACT

Disclosed is a system for copying data sets from a first storage device to a second storage device. The first storage device is managed by a first controller and the second storage device is managed by a second controller. The first controller receives a command to copy a plurality of data sets from the first storage device to the second storage device. First and second data structures are generated to include fields corresponding to the data sets. The fields initially indicate that the data sets have not been copied. For the data sets subject to the copy command, the first controller transfers a copy of the data set to the second controller. The second controller stores the copy of the data set received from the first controller in the second storage device. The field in the first data structure corresponding to the data set copied to the second storage device is then modified to indicate that the data set was copied to the second storage device. The field in the second data structure corresponding to the data set the second controller stores in the second storage device is also modified to indicate that the data set was stored in the second storage device.

25 Claims, 9 Drawing Sheets

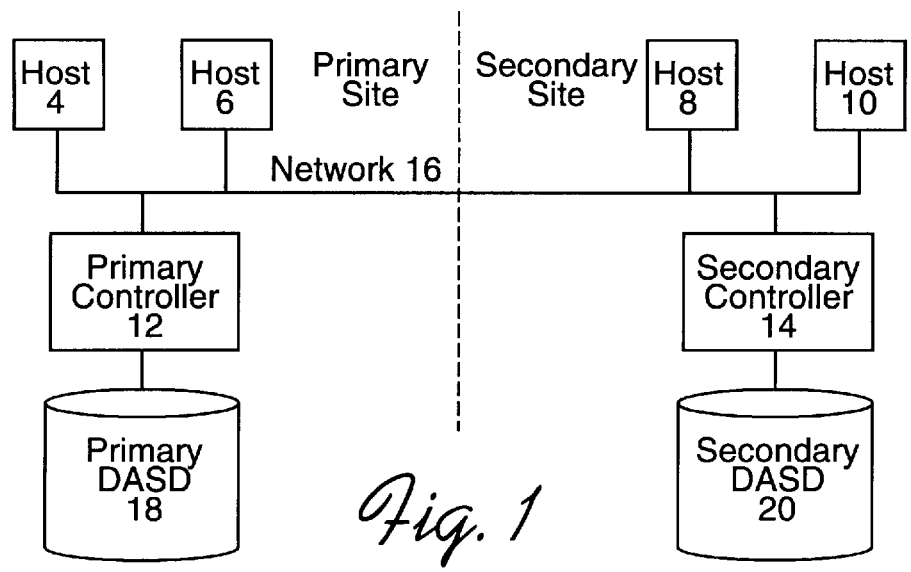

Fig. 1

| Field Name | Description of Field |
|---|---|
| Number of extent pairs. | Indicates the number of extent pairs in the table. |
| Target/source device address. | Identifies addresses of the source (primary) and target (secondary) DASDs involved in copy operation. |
| Source start | Identifies the first track where to copy from. |
| Number of tracks | Binary count of tracks to copy. |
| Target start | Identifies the first track to update on the target DASD. |
| Peer link | Indicates the peer device. |
| Tracks to copy | Number of tracks for each extent that have not been copied to the target. |
| Time stamp | Value created at time relationship created. |
| Next track pointer | Pointer to the ext track to copy. |
| Additional extent pairs for devices paired. | Primary (source) and secondary (target) starts/ends for additional sets of extents for current pair of devices to copy. |

Fig. 2

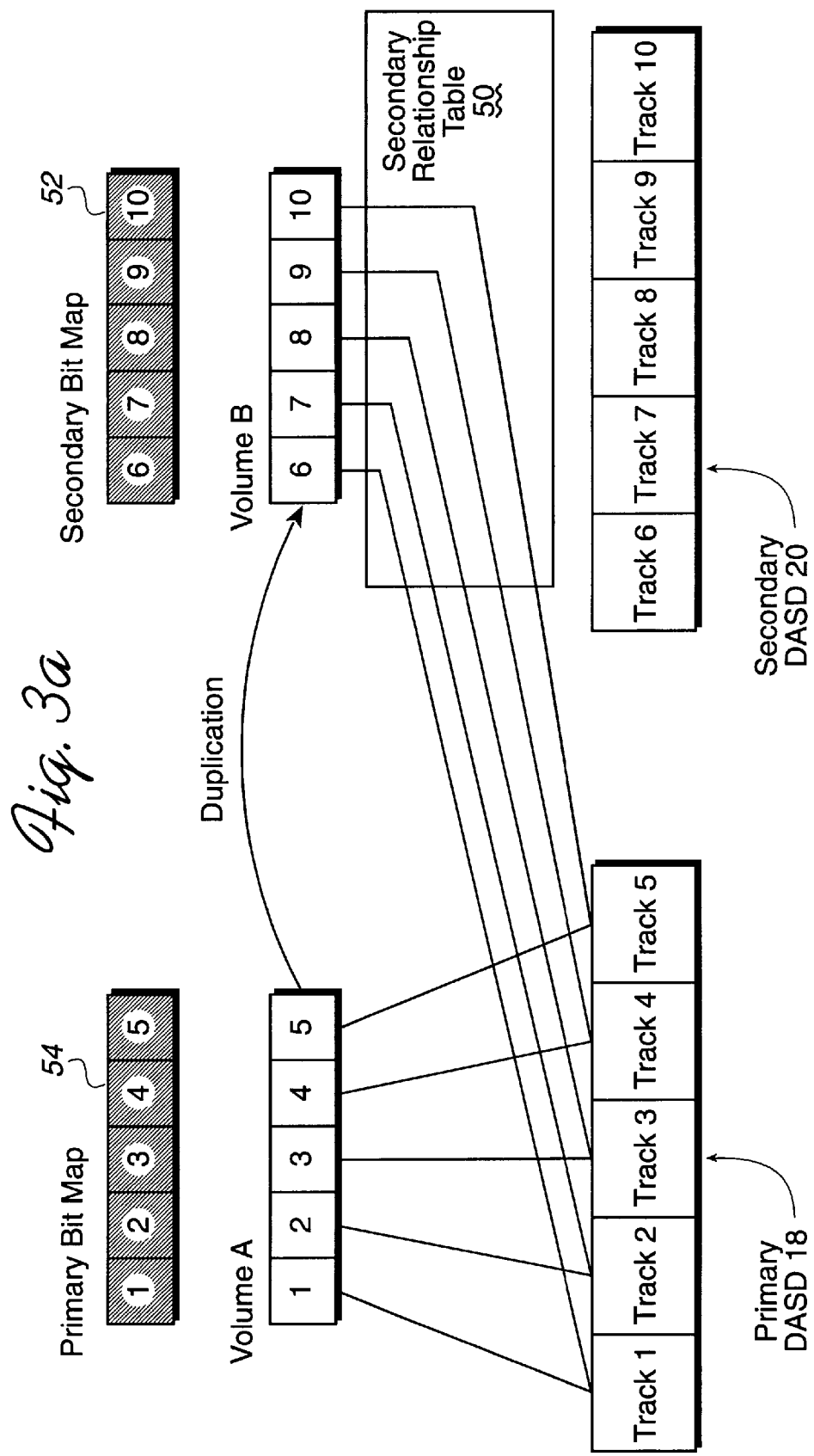

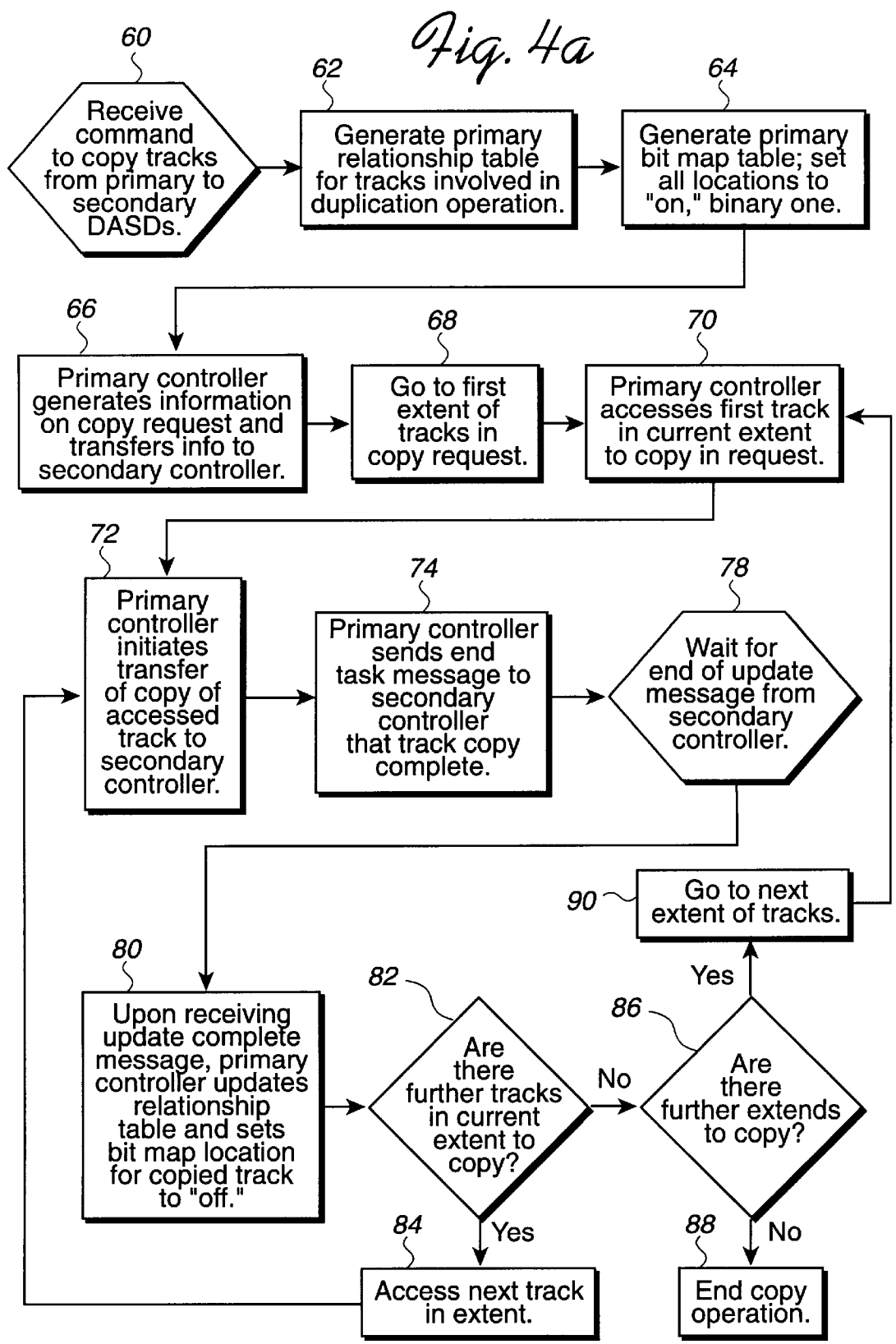

DATA COPY BETWEEN PEER-TO-PEER CONTROLLERS

BACKGROUND OF THE INVENTION

1. Field of the Invention

The present invention relates to a system for maintaining two copies of data at two different locations.

2. Description of the Related Art

A key feature of any disaster recovery system is the backup of critical data and updates to such backed-up data as soon as possible. The simplest method of backing up data is with off-site backups. However, the extent of successful data recovery in the event of failure is dependent upon the frequency of updates to the backed-up data. If a failure occurs between updates, then data updated but not backed-up may be lost. Thus, the greater time delay between back-ups, the less data is recoverable. On the other hand, increasing the frequency of back-ups causes delays in responding to requests to the volumes being backed-up. Volumes involved in back-up operations are typically unavailable for use by application programs. Thus, increasing the frequency of updates to the data back-up increases the time during which particular volumes involved in the back-up operations are unavailable.

One data back-up system is the Peer-to-Peer Remote Copy (PPRC) function offered by International Business Machines, Corporation ("IBM"), the assignee of the subject patent application. PPRC provides synchronous copying of data from a primary controller to a remote (secondary) controller. The PPRC system includes two controllers and two direct access storage devices (DASDs), a primary controller and associated primary DASD at one site and a secondary controller and secondary DASD at another site. Often, both controllers include a non-volatile storage unit ("NVS"), such as a battery backed up storage unit, to maintain data in the event of a power or system failure. With PPRC, when data is written to the primary NVS, the data is then transferred to the NVS in the secondary controller. At later points in time, the data in the primary and secondary NVSs will be destaged to the attached storage devices. With PPRC, there is minimal risk of losing data upon the occurrence of a failure because data is backed up at the secondary volumes synchronously with updates to the data at the primary DASD managed by the primary controller. The PPRC feature and other backup copy operations are further described in IBM publication "3990/9390 Storage Control Introduction," document no. GA32-0098-08 (IBM Copyright 1987, 1996), which publication is incorporated herein by reference in its entirety.

One problem with prior art PPRC type back-up systems is that the tracks or volumes being backed up between the primary and secondary DASDs are unavailable for use while PPRC back-ups are being serviced. The PPRC operation does not consider the transfer of data to the secondary site complete until all the data updated at the primary DASD has been copied and backed-up to the secondary DASD. Thus, updates to the primary DASD delay response time to user requests to the volumes involved in the update because a synchronous update must be made to the secondary DASD before the volume involved is available. Response delays can occur with respect to requests to both the primary and secondary DASDs. Users making requests to a volume in either the primary or secondary DASD subject to a back-up operation must wait until the completion of the back-up before they can access the updated data.

As the data transfer size and distance between the primary and secondary DASDs increase, the service time of synchronous PPRC updates to both the primary and secondary DASDs increases. Increase in service time for data back-ups resulting from increased distances or larger data transfer sizes likewise delays the response to requests from host systems or application programs for volumes involved in PPRC updates. Moreover, the response time will also increase with respect to requests to volumes in the primary DASD not involved in PPRC updates to the secondary controller. This degradation in response time is often substantial, ranging anywhere from 10% to 200%.

SUMMARY OF THE PREFERRED EMBODIMENTS

To overcome the limitations in the prior art described above, the preferred embodiments disclose a system for copying data sets from a first storage device to a second storage device. The first storage device is managed by a first controller and the second storage device is managed by a second controller. The first controller receives a command to copy a plurality of data sets from the first storage device to the second storage device. First and second data structures are generated to include fields corresponding to the data sets. The fields initially indicate that the data sets have not been copied. For the data sets subject to the copy command, the first controller transfers a copy of the data set to the second controller. The second controller stores the copy of the data set received from the first controller in the second storage device. The field in the first data structure corresponding to the data set copied to the second storage device is then modified to indicate that the data set was copied to the second storage device. The field in the second data structure corresponding to the data set the second controller stores in the second storage device is also modified to indicate that the data set was stored in the second storage device.

In further embodiments, a host request to the second storage device for a data set that has not yet been copied over from the first storage device will cause the second controller to generate and transmit a message to the first controller requesting the requested data set. In response, the first controller accesses the data set requested by the second controller in the message and transfers the requested data set to the second controller. The second controller then stores the requested data set received from the first controller in the second storage device and transmits the requested data set to the host system.

In yet further embodiments, an update to a data set in the first storage device that has not yet been copied over to the second storage device will cause the first controller to transfer the data set to update to the second controller. The second controller will then store the data set received from the first controller in the second storage device. The first controller stores the update to the data set in the first storage device after transferring the data set prior to the update to the second controller.

The preferred embodiments allow for immediate copying of updates to data sets at a primary storage device to a secondary storage device which may be at a remote location. This immediate transfer insures that the backup of the secondary storage reflects the data sets at the time the backup request was initiated and the ability to recover data in the event of a failure at the primary storage device. Moreover, requests for data at the secondary storage device that shadows data maintained in the primary storage device are handled in a manner to insure that the current data maintained at the primary storage device is provided in response to the request. This servicing of requests is handled prior to the completion of the transfer of all data sets to the secondary storage device to improve the response time to data requests.

Another benefit of certain embodiments is that before data is updated to the primary storage device after a copy operation has been initiated, the pre-update version of the data set is transferred to the secondary storage device to insure that the secondary storage device maintains the data in existence at the time the copy operation was initiated. Such handling of updates is handled prior to the completion of the transfer of all data sets to secondary storage to insure that all updates are made.

The preferred embodiments, thus, provide a mechanism for immediately backing-up data at the primary and secondary sites and at the same time efficiently handling requests for access and updates of data before the transfer of all data has been completed.

BRIEF DESCRIPTION OF THE DRAWINGS

Referring now to the drawings in which like reference numbers represent corresponding parts throughout:

FIG. 1 is a block diagram illustrating a software and hardware environment in which preferred embodiments of the present invention are implemented;

FIG. 2 illustrates a data structure used in copying data in accordance with preferred embodiments of the present invention;

FIG. 3a illustrates data structures used in copy operations in accordance with preferred embodiments of the present invention;

FIG. 4a is a flowchart showing logic implemented in the primary controller to copy data from the primary DASD to a secondary controller in accordance with preferred embodiments of the present invention;

DETAILED DESCRIPTION OF THE PREFERRED EMBODIMENTS

Figure 3B:
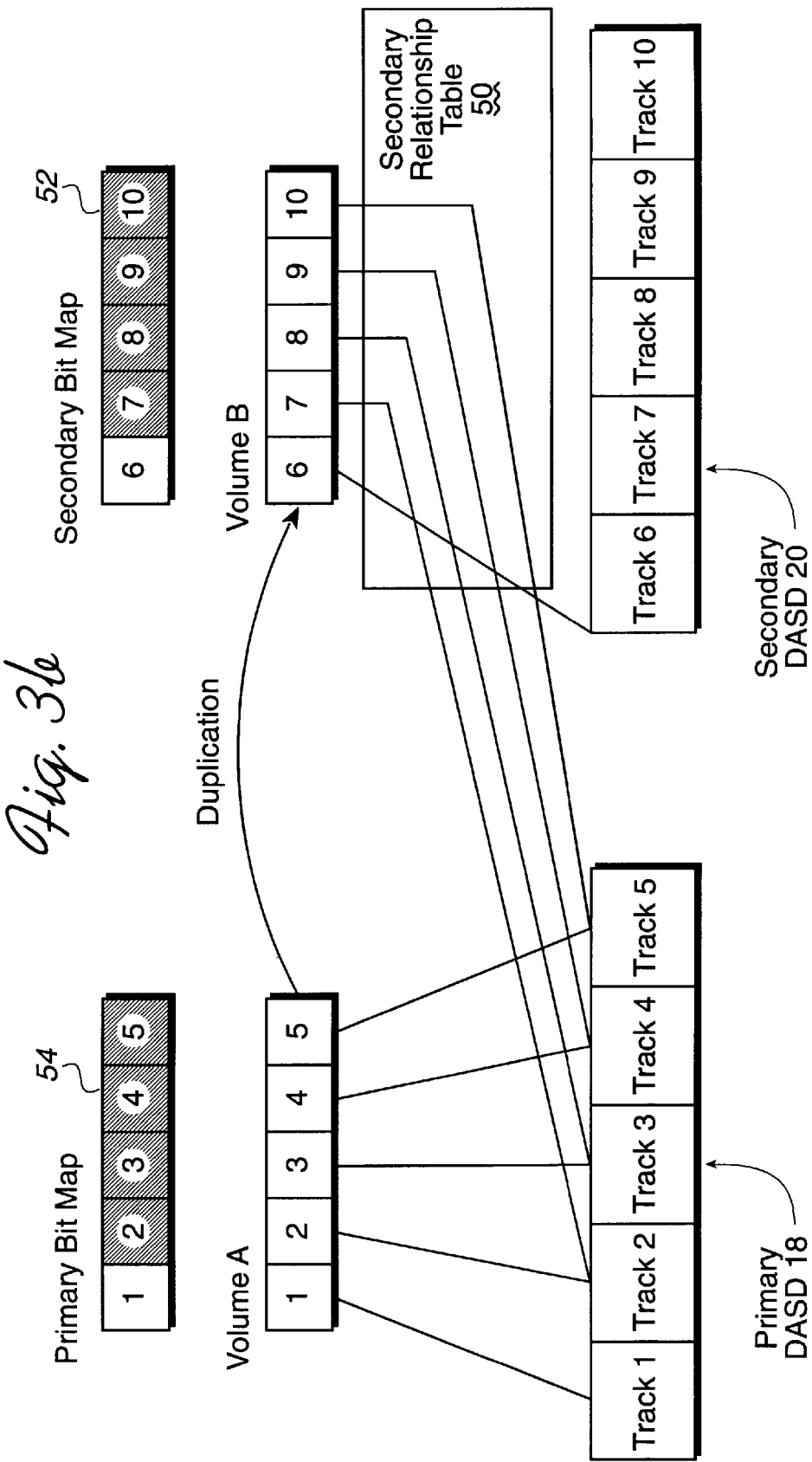
FIG. 3b illustrates data structures used in copy operations in accordance with preferred embodiments of the present invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

FIG. 1 illustrates a preferred hardware and software environment in which preferred embodiments of the present invention may be implemented. A plurality of host systems 4, 6, 8, and 10 may communicate with each other and a primary controller 12 and secondary controller 14 via a network 16. The host systems 4, 6 and primary controller 12 are at a primary site and the host systems 8, 10 and secondary controller 14 are at a secondary site. The primary and secondary sites may be in separate geographical locations. The primary controller 12 controls access to a primary direct access storage device (DASD) 18. Similarly, the secondary controller 14 controls access to a secondary DASD 20. The primary 18 and secondary 20 DASDs may be hard disk drives, magnetic tape drives, optical disks, holographic units or any other non-volatile storage device or system known in the art. The host systems 4, 6, 8, 10 access the DASDs 18, 20 via the controllers 12, 14. The controllers 12, 14 include storage areas, such as a ROM, PROM or EEPROM to store microcode and a volatile memory device, e.g., RAM, DRAM, to store operands and other data. The controllers 12, 14 may further include a non-volatile storage unit, e.g., a non-volatile RAM or battery backed-up RAM, to maintain copies of updated data not yet transferred to the DASDs 18, 20.

The host systems 4, 6, 8, 10 may be any computer system known in the art, such as a mainframe, personal computer, workstation, laptop, etc. The host systems 4, 6, 8, 10 include an operating system, e.g., OS390™, MVS/ESA™, etc. OS390 and MVS/ESA are trademarks of IBM. The primary 12 and secondary 14 controllers are storage controllers, such as the IBM 3990 Model 6 or 9390 storage controllers. However, those skilled in the art will appreciate that any other processing unit capable of being programmed to implement the preferred embodiments of the present invention may also be used as the controllers 12, 14. Further, any operating system may be utilized in the host systems 4, 6, 8, 10. The operating systems and logic in the host systems 4, 6, 8, 10 and storage controllers 12, 14 further include additional logic to perform operations in accordance with preferred embodiments of the present invention.

The network 16 for communication among the hosts 4, 6, 8, 10 and/or storage controllers 12, 14 may be any suitable communication system known in the art, including LAN, SAN, WAN, ETHERNET, Internet, fiber optic, etc. In preferred embodiments, the network 16 may be comprised of Enterprise System Connection (ESCON®) components providing direct communication between the primary 12 and secondary 14 controllers. ESCON is a registered trademark of IBM. An ESCON director may provide communication between any of the hosts 4, 6, 8, 10 and controllers 12, 14. If an ESCON or other long distance communication network 16 is used, the primary and secondary sites may be several miles apart.

The primary controller 12 may transfer data to the secondary controller 14 directly. In preferred embodiments, for any data the primary controller 12 updates in the primary DASD 18, the primary controller 12 may also transfer such updated data to the secondary controller 14 for concurrent storage in the secondary DASD 20. Host systems 8, 10 may access data maintained by the primary DASD 18 at the secondary DASD 20.

Data Structures Used In Duplicating Data

In preferred embodiments, the host systems 4, 6, 8, 10 include software to control the primary 12 and secondary 14 controllers to perform copy operations with respect to data sets, tracks or volumes updated in the primary DASD 18 to the secondary DASD 20 in two parts. The first part of the copy operation of the preferred embodiments is to copy the address information for volumes and tracks in the primary DASD 18 to the secondary DASD 20 via the controllers 12, 14. The primary 12 and secondary 14 controllers process this address information to determine the state of the tracks and volumes in the primary 18 and secondary 20 DASDs involved in copy operations. The second part of the update operation is for the primary controller 12 to copy data from the primary DASD 18 to the secondary DASD 20.

After a user at a host system 4, 6, 8, 10 initiates a copy operation for a set of primary tracks and target secondary tracks, the primary controller 12 generates address information for such copy operation, which in preferred embodiments includes a relationship table describing the relationship of the tracks involved in the copy operation to the primary 18 and secondary 20 DASDs and a bit map table describing the status of particular tracks involved in the copy operation. In preferred embodiments, only the controllers 12, 14 maintain this address information, including primary (source) and secondary (target) relationship tables and bit map tables.

FIG. 2 illustrates a preferred embodiment of the fields in a relationship table maintained by the primary 12 and secondary 14 controllers The relationship table data structure includes a number of fields that list the requested extents of tracks, volumes or other data sets to be copied and the target tracks to where such source tracks will be copied. The first field, the number of extent pairs 32, indicates the number of copy operations requested for a specific target/source device pair, wherein the source refers to the primary DASD 18 and the target refers to the secondary DASD 20 to which the data is copied. The second field, target/source device address 34 identifies the address of the source (primary) and target (secondary) devices involved in copy operations. The source start field 36 identifies the first track in the primary DASD 18 from where data is to be copied. The number of tracks field 38 indicates the number of tracks to be copied. The target start field 40 indicates the first track to which data is copied to in the secondary DASD 20. The peer link field 42 indicates the identification of the peer device.

The tracks to copy field 44 indicates the number of tracks for each extent of tracks for the specific target/source pair that have not been copied to the secondary DASD 20. The time stamp field 46 includes a unique number, such as a time stamp, that is generated when the relationship between the volumes or data sets to be copied is established. This time stamp data is used to insure that only data in existence at the time of the creation of the relationship is moved as part of the copy operations. The next track pointer 48 field is a pointer to the next track to copy in the copy operation. After a track is copied the next track pointer 48 is incremented to point to the next track in the sequence of tracks to copy. The next track pointer 48 is also used to determine the track from the target start to which the next track must be copied. The additional extent pairs field 50 indicates pairs of start and end locations in the primary 18 and secondary DASDs of extents of sequential tracks to be copied for the specific primary 18 and secondary 20 DASDs identified in the target/source device address field 34.

The relationship table 30 for controllers 12, 14 involved in copy operations provides the relationship of tracks in a DASD that are involved in a copy operation with another DASD, and other relevant information about that copy operation, such as the identity of the other DASD involved. This information allows the controllers 12, 14 to determine information about the tracks in the DASDs 18, 20 they control that are involved in a copy operation. With the relationship table 30, the controllers 12, 14 can determine which tracks are involved in a copy operation and the identity of other devices involved in such copy operation.

In preferred embodiments, a track in the target or secondary DASD 20 can have only one related source or primary DASD 18, i.e., only one primary DASD 18 will be updating that particular track. Thus, for any given target extent in a copy operation, the target relationship table may identify only one source device for a particular target device. A track in the source or primary DASD 18 can have multiple targets onto which data is copied. Thus, for any given source extent in a copy operation, the source relationship table may identify multiple target devices.

The controllers 12, 14, further maintain bit map tables for the primary 18 and secondary 20 DASDs. The primary bit map table includes an addressable location for each track in the primary DASD 18 that is to be duplicated to the secondary DASD 20. The secondary bitmap table includes an addressable location for each track in the secondary DASD 20 that is to be updated with data from the primary DASD 18. In preferred embodiments, the addressable locations in the primary and secondary bit map tables are set as "on" or to binary one for those extents to be copied from the primary 18 to secondary 20 DASDs. When a track has been copied from the primary DASD 18, the addressable location for that copied track in the primary bit map table is turned "off," or set to binary zero. Likewise, when a track in the secondary DASD has been updated, the addressable location for the updated track in the secondary bit map table is turned "off", i.e., set to binary zero.

The primary controller 12 maintains a primary relationship table and bit map table and the secondary controller 14 maintains a secondary relationship table and bit map table. The controllers 12, 14 include volatile and/or non-volatile storage locations to maintain one or more copies of the address information, i.e., the relationship and bit map tables. This address information allows the controllers 12, 14 to determine which tracks in the primary 18 and secondary 20 DASDs are involved in duplication operations and the relationships for such operations.

In preferred embodiments, the host system 4, 6, 8, 10 view data in the primary 18 and secondary 20 DASDs as volumes comprised of tracks. For instance, as shown in FIGS. 3*a, b,* the host systems 4, 6, 8, 10 view a portion of the primary DASD 18 as volume A, comprised of tracks 1–5 and a portion of the secondary DASD 20 as volume B, comprised of tracks 6–10. The host systems 4, 6, 8, 10 include tables to map the perceived logical volumes and tracks to physical locations on the DASDs 18, 20.

FIGS. 3*a, b* illustrates the address information maintained by the controllers 12, 14 at different stages of the copy process. In FIG. 3*a*, the extent of tracks 1–5 in volume A of the primary DASD 18 are copied to tracks 6–10 in volume B in the secondary DASD 20. Prior to transferring the data, the secondary relationship table 50 maps target tracks in the secondary DASD 20 to the source tracks in the primary DASD 18 because such data has not been physically copied to the secondary DASD 20. The secondary controller 14 can determine whether the tracks have been copied by processing the secondary bit map table 52 which indicates whether a track in the secondary DASD 20 has been updated. The shaded blocks are "on," thus, indicating that data has not yet been copied to the track in the secondary DASD 20 that is the target of the copy operation. Likewise, the primary controller 12 can determine whether a track from the primary DASD 18 has been copied to the secondary DASD by processing the primary bit map table 54. The shaded blocks are "on," thus, indicating that the source tracks in the primary DASD 20 have not yet been copied to the target track in the secondary DASD 20 identified in the source relationship table (not shown).

The primary controller 12 may copy tracks in a sequential order. FIG. 3b illustrates how the address information in the bit map tables 52, 54 and the secondary relationship table 50 is updated after the first track in the duplication operation has been copied over. After the first track, track 1, has been copied over to track 6 in the secondary DASD 20, the address information is updated. As part of this update, the address locations in the primary 54 and secondary 52 bit map tables corresponding to the source and target tracks involved in the copy operation, i.e., tracks I and 6, have been turned "off,", i.e., set to binary zero, to indicate that such track has been copied over. The secondary relationship table 50 is updated. For instance, the tracks to copy field 44 is updated to indicate that one less track needs to be copied. The next track pointer field 48 is incremented in both the primary and secondary relationship tables to point to the next track in the extent to copy. After copying all the tracks, or reducing the tracks to copy field 44 to zero, if there are further extent pairs indicated in the additional extent pair field 48, then the primary controller 12 would proceed to copy the sequence of tracks in the next extent. The source start 36, number of tracks 38, target start 40, tracks to copy 44, and next track pointer 48 fields would be updated to include the information for the next extent to be copied.

In this way, if a host system 4, 6, 8, 10 requests access to a track in the primary 18 or secondary 20 DASD that is involved in a copy operation, the primary 12 and/or secondary controller 14 can determine whether the requested track is involved in a copy operation and whether such information has been completed.

Thus, the preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Logic for Duplicating Data Between Peer Controllers

Figure 4B:
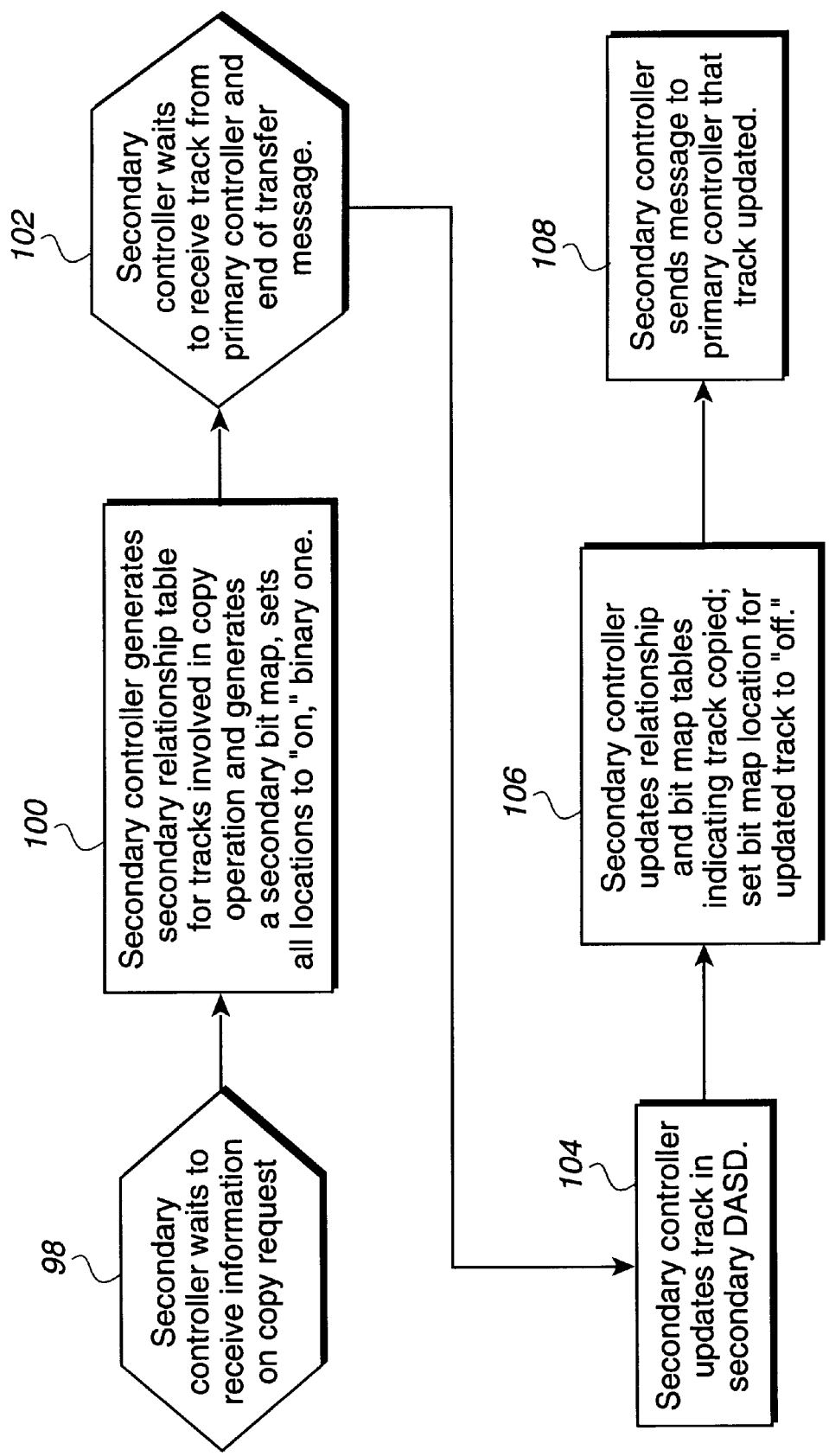
FIG. 4b is a flowchart showing logic implemented in the secondary controller to store data from the primary DASD in the secondary DASD in accordance with preferred embodiments of the present invention.
Figure 5A:
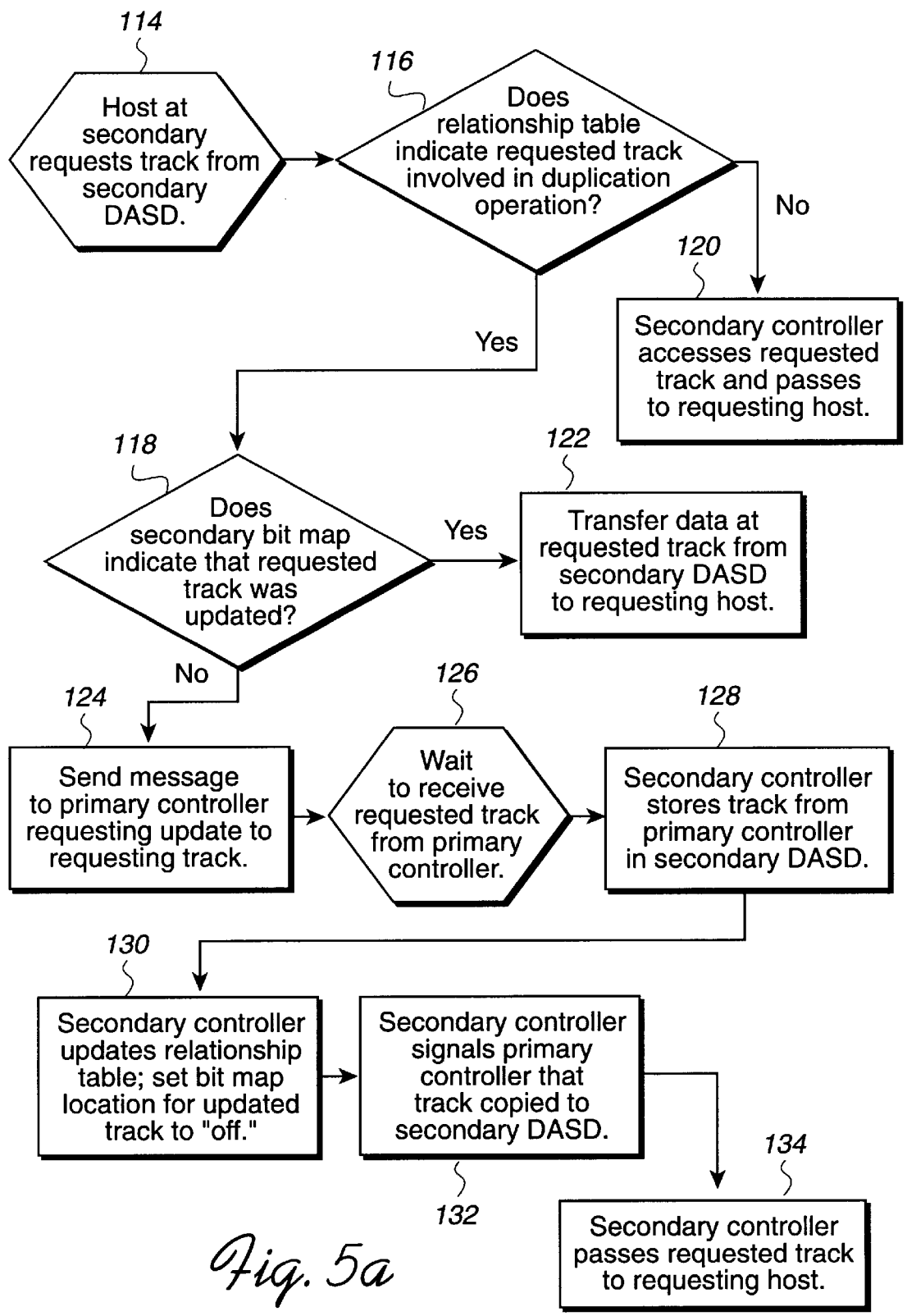
FIG. 5a is a flowchart showing logic implemented in the secondary controller to service a request for data from the secondary DASD in accordance with preferred embodiments of the present invention.
Figure 5B:
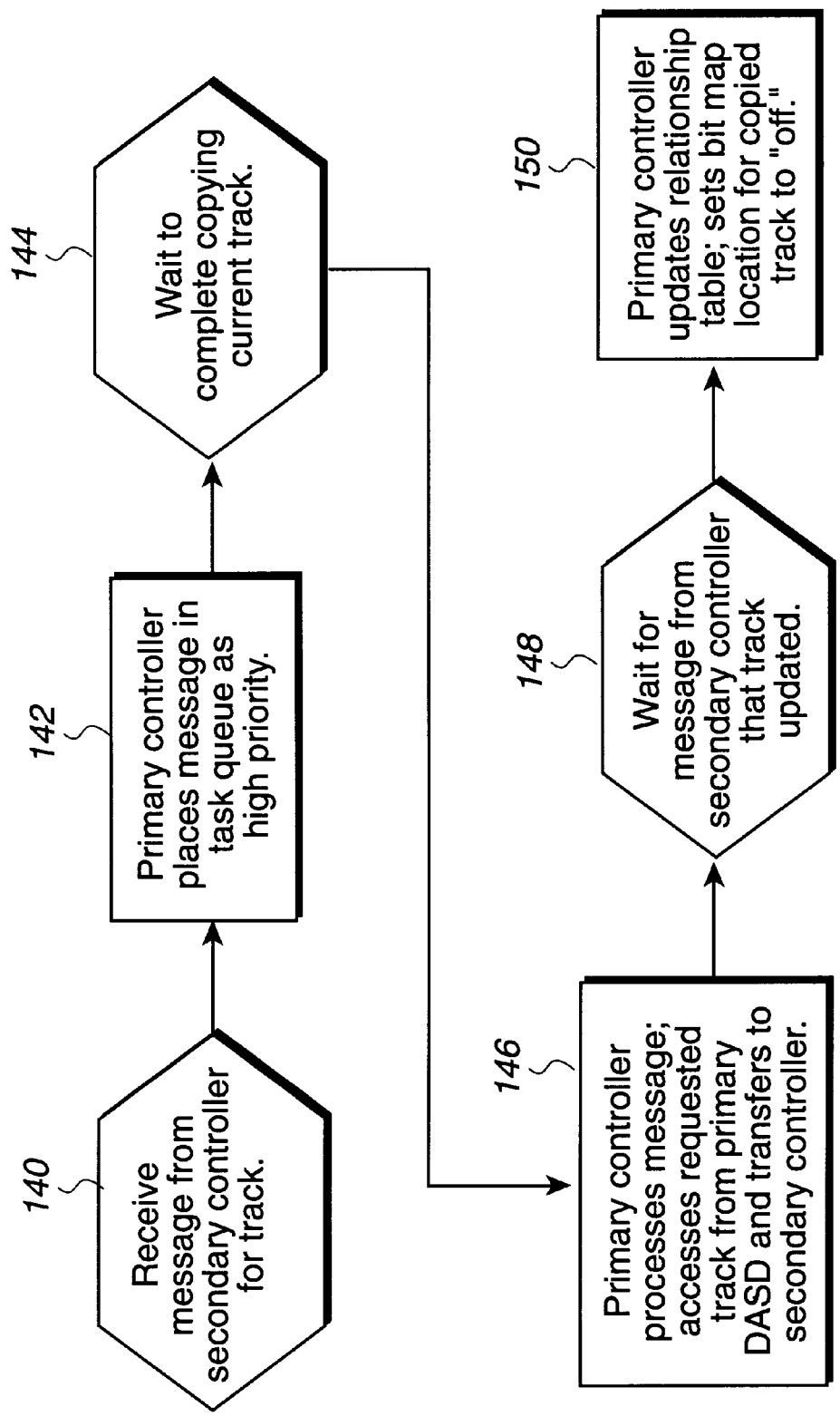
FIG. 5b is a flowchart showing logic implemented in the primary controller to service a request for data from the secondary controller for data in accordance with preferred embodiments of the present invention.
Figure 6A:
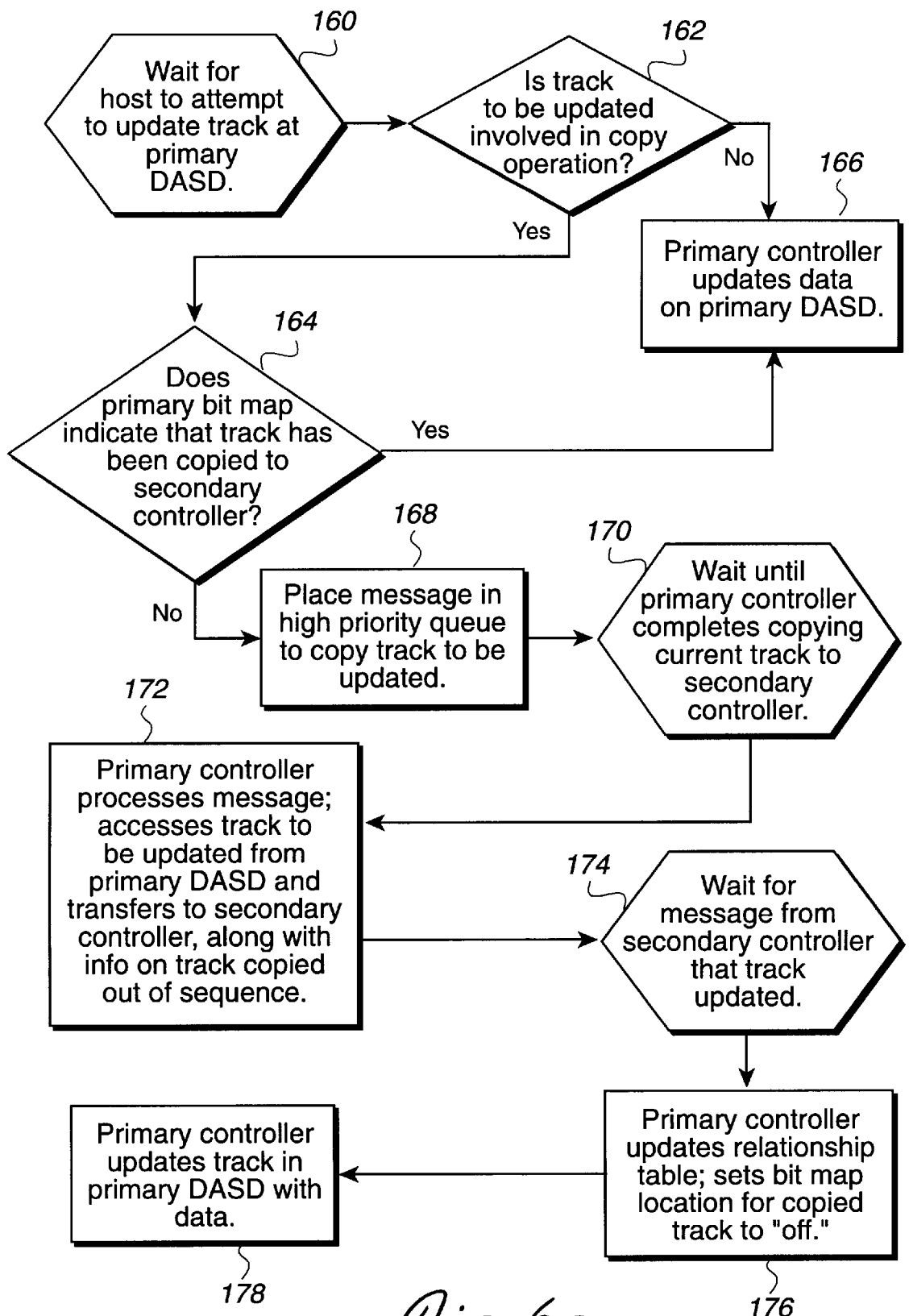
FIG. 6a is a flowchart showing logic implemented in the primary controller to service a request for data from the primary DASD in accordance with preferred embodiments of the present invention.
Figure 6B:
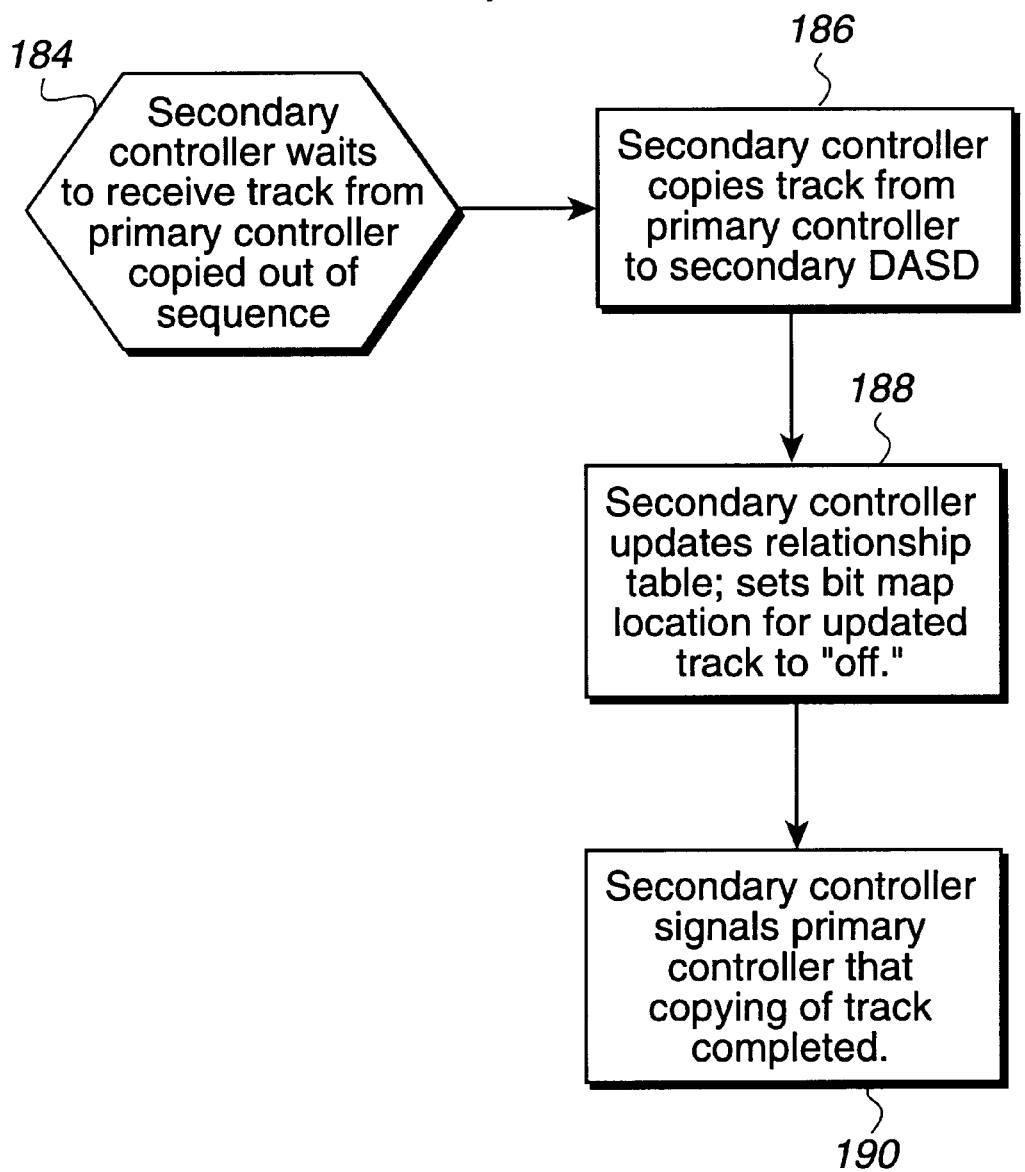
FIG. 6b is a flowchart showing logic implemented in the secondary controller to store data from the primary DASD, transferred in response to the logic of FIG. 6a, in accordance with preferred embodiments of the present invention.

FIGS. 4a, b, 5a, b, and 6a, b illustrate logic implemented in the hardware, software and/or microcode of the primary 12 and secondary 14 controllers to perform data duplication operations between the primary 18 and secondary 20 DASDs in accordance with preferred embodiments of the present invention. This preferred logic is for illustrative purposes. In particular, the logic of FIGS. 4a, 5b, 6a is described with respect to the primary controller 12 and the logic of FIGS. 4b, 5a, 6b is described with respect to the secondary controller 14. However, because both controllers can be the target and source of a copy operation, all controllers include all logic. The controllers 14, 16 implement particular logic depending on whether they function as a primary (source) controller or secondary (target) controller. Those skilled in the art will further appreciate that the logic steps described herein may be performed in an order different from the order presented and that modified or different logic steps may also be used.

FIG. 4a illustrates logic implemented in the primary controller 12 for copying data from the primary DASD 18 to the secondary controller 14 in accordance with preferred embodiments of the present invention. Control begins at block 60 which represents the primary controller 12 receiving a request from a host system 4, 6 at the primary site to copy extents of tracks from the primary DASD 18 to the secondary DASD 20. The request may specify the extents on the secondary DASD 20 which will be updated. Control proceeds to block 62 which represents the primary controller 12 generating a primary relationship table including information on the tracks to be updated. Control proceeds to block 64 which represents the primary controller 12 generating a primary bit map table 54 and setting all addressable locations corresponding to tracks included in the copy request to "on," which indicates that such tracks have not been copied over. Control transfers to block 66 which represents the primary controller 12 generating a message including information on the extents of tracks involved in the copy request and transferring such message to the secondary controller 14.

Control proceeds to block 68 which represents the primary controller 12 going to the first extent of tracks in the copy request. Control transfers to block 70 which represents the primary controller 12 accessing the first track of the current extent in the copy request. Control transfers to block 72 which represents the primary controller 12 initiating a copying operation of the accessed track in the primary DASD 18 to the secondary controller 14. Control transfers to block 74 which represents the primary controller 12 sending an end task message to the secondary controller 14 indicating that a complete track has been copied over. Control then transfers to block 78 which represents the primary controller 12 waiting for a message from the secondary controller 14 that the track transferred over has been updated in the secondary DASD 20. Upon receiving the message that the track was updated in the secondary DASD 20, control transfers to block 80 which represents the primary controller 12 updating the primary relationship table to indicate that a track has been copied and setting the address location in the primary bit map 54 corresponding to the copied track to "off," i.e., binary zero. In preferred embodiments, the primary controller 12 may update the primary relationship table by updating the tracks to copy field 44 to indicate one less track to copy and incrementing the next track pointer 48 field to point to the next track in the extent of tracks to copy.

Control transfers to block 82, which is a decision block representing the primary controller 12 processing the primary relationship table to determine whether there are any further blocks in the current extent to copy, i.e., whether the tracks to copy field 44 is greater than zero. If so, control transfers to block 84; otherwise, control transfers to block 86. Block 84 represents the primary controller 12 accessing the next track in the current extent and proceeding back to block 72 et seq. to copy the next track from the primary DASD 18 to the secondary DASD 20. If there are no further tracks in the current extent, control transfers to block 86 which represents the primary controller 12 accessing the primary relationship table to determine whether there are further extents of tracks to copy. In particular, the primary controller 12 could process the additional extent pair field 50 to determine whether there are further extents to copy. When an extent of tracks is copied, the primary controller 12 could remove the copied extents from the primary relationship table, leaving only uncopied extents of tracks.

If there are no further extents, control transfers to block 88 which represents the end of the copy operation. Otherwise, if there are further extents, control transfers to block 90 which represents the primary controller 12 accessing the next extent of tracks and proceeding back to block 70 et seq. to copy over the next extent of tracks.

FIG. 4b illustrates logic described with respect to the secondary controller 14 to update the tracks received from the primary controller 12. Control begins at block 98 which represents the secondary controller 14 waiting to receive information on a copy request. Control proceeds to block 100 which represents the secondary controller 14 generating the secondary relationship table 50 and the secondary bit map table 52. The secondary controller 14 would initially set all bit map locations for the tracks to be updated to "on," i.e., binary one. Control then transfers to block 102 which represents the secondary controller waiting to receive a track from the primary controller 12 to update in the secondary DASD 20 and an end of transfer message indicating that the entire track has been transferred. Upon receiving the entire track, control transfers to block 104 which represents the secondary controller 14 updating the received track in the secondary DASD 20. To determine which track to update, the secondary controller 14 may process the target start field 40 and the source start field 36 to locate the track in the secondary DASD 20 that should be updated with the track transferred from the primary controller 12.

Control then transfers to block 106 which represents the secondary controller 14 updating the secondary relationship and bit map tables to indicate that the current track was updated. The secondary controller 14 would set the bit map location for the updated track to "off" and increment the next track pointer field 48 to the next track in the current extent and update the tracks to copy field 44 to indicate one less track to copy. Control transfers to block 108 which represents the secondary controller 14 sending a message to the primary controller 12 that the track was updated in the secondary DASD 20.

FIG. 5a illustrates logic described with respect to the secondary controller 14 to handle a request from a host 8, 10 at the secondary site to access a track in the secondary DASD 20 involved in a copy operation. Control begins at block 114 which represents the secondary controller 14 receiving a request to access a track from the secondary DASD 20 from a host system 8, 10 at the secondary site. Control transfers to block 116 which represents the secondary controller 14 processing the secondary relationship table 50 to determine whether the requested track is involved in a copy operation. The secondary controller 14 may process the information in the target start field 40 and the number of tracks field 38 to determine if the requested track is involved in a copy operation. If the requested track is involved in a copy operation, then control transfers to block 118; otherwise, control transfers to block 120 which represents the secondary controller 14 accessing the requested track and transferring the requested track to the requesting host 8, 10.

Block 118 is a decision block representing the secondary controller 14 processing the secondary bit map table 52 to determine whether the requested track was updated, i.e., whether the address location for the requested track is "off." If the requested track was updated, control transfers to block 122 which represents the secondary controller 14 accessing the requested track from the secondary DASD 20 and passing the requested track to the requesting host 8, 10. If the requested track has not yet been updated, i.e., the corresponding address location in the secondary bit map table 52 is "on," then control transfers to block 124 which represents the secondary controller 14 transmitting a message to the primary controller 12 via the network 16 requesting the update to the requested track. Control transfers to block 126 which represents the secondary controller 14 waiting to receive the requested track from the primary controller.

Upon receiving the requested track, at block 128, the secondary controller 14 stores the track from the primary controller 12 in the secondary DASD 20. To determine which track in the secondary DASD 20 to store the data, the secondary controller would process information in the secondary relationship table 52, such as the target start field 40 and the source start field 36 to determine which track to copy the updated data. For instance, the secondary controller 14 may process the target start field 40 and source start field 36 to determine which track from the target start field 40 to update. Control then transfers to block 130 which represents the secondary controller 14 updating the secondary relationship table 50 to indicate the track updated and setting the bit map location for the updated track to "off," i.e., binary zero. When updating the secondary relationship table 50, the secondary controller 14 may increment the next track pointer 48 field to point to the next track to be updated and the tracks to copy field 44 to indicate one less track to copy.

Control then transfers to block 132 which represents the secondary controller 14 signaling the primary controller 12 that the track was copied to the secondary DASD 20. Control then transfers to block 134 which represents the secondary controller 14 passing the requested track retrieved from the secondary DASD 20 to the requesting host 8, 10.

FIG. 5b illustrates logic performed by the primary controller 12 when transferring a track requested from the secondary controller 14 pursuant to the logic of FIG. 5a. Control begins at block 140 which represents the primary controller 12 receiving a message from the secondary controller 14 for a track that is part of the copy operation and that has not yet been updated in the secondary DASD 20. Control transfers to block 142 which represents the primary controller 12 placing the message in a task queue at a high priority. Control transfers to block 144 which represents the primary controller 12 completing the transfer of the current track. After transferring the current track to the secondary controller 14, control transfers to block 146 which represents the primary controller 12 processing the message, accessing the requested track from the primary DASD 18 and transferring the requested track to the secondary controller 14. Control transfers to block 148 which represents the primary controller 12 waiting for a message from the secondary controller 14 that the track was updated. Control transfers to block 150 which represents the primary controller 12 updating the primary bit map table 54 to indicate that the track was copied to the secondary DASD 20.

With the preferred logic of FIGS. 5a, 5b, the secondary controller 14 provides a host requesting data from the secondary DASD 20 current data, even if the data has not yet been updated at the secondary DASD 20. Moreover, after a request for data not yet copied to the secondary DASD 20 has been processed, the requested data has been copied over and the bit map tables reflect that the data requested out of order was copied over. In such case, when determining whether to copy a track from the primary DASD 18 to the secondary DASD 20 as part of the logic of FIG. 4a, the primary controller 12 would check the primary bit map table 54 to see if the track has already been updated. If the track was already updated, then the primary controller 12 will proceed to access the next track in the extent to copy over.

FIG. 6a illustrates logic performed by the primary controller 12 for updating a track involved in the copy operation out of sequence. Control begins at block 160 which represents a host 4, 6 at the primary site attempting to update a track in the primary DASD 18. Control transfers to block 162 which is a decision block representing the primary controller 12 determining whether the track to be updated is involved in a copy operation. If so, control transfers to block 164; otherwise, control transfers to block 166 which represents the primary controller 12 updating the data in the primary DASD 18. Block 164 is a decision block representing the primary controller 12 processing the primary bit map table 54 to determine if the track has been copied to the secondary DASD 20. If so, control transfers to block 166 to update the data in the primary DASD 18. Otherwise, if the data has not been updated, control transfers to block 168 which represents the primary controller 12 placing a message at high priority in the queue to copy the track to be updated.

Control transfers to block 170 which represents the primary controller 12 waiting to complete copying the current track to the secondary controller 14. Upon completing the copying of the current track if there is one in progress, at block 172, the primary controller 12 processes the messages, accesses the track to be updated from the primary DASD 18 and transfers the accessed track to the secondary controller 14. The primary controller 12 may provide information to the secondary controller 14 on the track copied out of sequence. Control transfers to block 174 which represents the primary controller 12 waiting for a message from the secondary controller that the track has been updated. Upon receiving the message, control transfers to block 176 which represents the primary controller 12 updating the relationship table, i.e., the tracks to copy 44 and next track pointer 48 fields, and setting the bit map location for the copied track to "off." Control then transfers to block 178 which represents the primary controller 12 updating the track in the primary DASD with the updated data.

FIG. 6b illustrates logic performed by the secondary controller 14 to update a track out of sequence in response to receiving a track from the primary controller 12 operating under the preferred logic of FIG. 6a. Control begins at block 184 which represents the secondary controller 14 waiting to receive a track from the primary controller 12 copied out of sequence. Control transfers to block 186 which represents the secondary controller 14 copying the track received from the primary controller 12 to the secondary DASD 20. Control transfers to block 188 which represents the secondary controller 14 updating the secondary relationship table and setting the value at the bit map location for the updated track to "off." Control then transfers to block 190 which represents the secondary controller 14 signaling the primary controller that the track was updated.

With the preferred logic of FIGS. 6a, b, before the primary controller 12 updates a track in the primary DASD 18 that is part of a copy operation and has not yet been copied to the secondary DASD 20, the primary controller 12 will provide the track from the primary DASD 18 to the secondary controller 14. In this way, the secondary controller 14 receives a copy of the data that was in existence when the copy operation was initiated, and not data updated after the copy operation was initiated. Again, when determining whether to copy a track from the primary DASD 18 to the secondary DASD 20 as part of the logic of FIG. 4a, the primary controller 12 would check the primary bit map table 54 to see if the track has already been updated. If the track was already updated, then the primary controller 12 will proceed to access the next track in the extent to copy over.

Conclusion

This concludes the description of the preferred embodiments of the invention. The following describes some alternative embodiments for accomplishing the present invention.

In the preferred embodiments, the bit map data structure is used to indicate whether tracks were copied from the primary 18 to secondary 20 DASDs. However, those skilled in the art will appreciate that alternative data structures may be used to indicate whether tracks or other data set types were copied from the primary DASD 19 to the secondary DASD 20.

In the preferred embodiments, the primary and secondary sites are in separate, distant geographical locations. Thus, the hosts 4, 6 at the primary site would only access the primary DASD 18 and the hosts 8, 10 at the secondary site would only access the secondary DASD 20. However, in alternative embodiments, the primary and secondary sites may be in a close or the same geographical location. In such, case the hosts 4, 6 may access and perform operations on data in the secondary DASD and the hosts 8, 10 may access and perform operations on the data in the primary DASD 18. The network 12 interfaces all attached hosts 4, 6, 8, 10 and the controllers 12, 14.

The above embodiments were described with respect to copying tracks. However, in alternative embodiments any data set grouping could be involved in the copy operation, including volumes, cylinders, or any other grouping of data or fixed blocks. In such case, the values in the relationship and bit map tables would indicate the status of storage units other than tracks, such as volumes, cylinders or any other type of data set or data grouping.

The above logic of FIGS. 4a, b, 5a, b, and 6a, b was described as implemented as code for the controllers 12, 14. However, in alternative embodiments various aspects of the logic described with respect to controllers 12, 14 could be implemented as software and/or hardware within the host systems 4, 6, 8, 10. Alternatively, the host systems 4, 6, 8, 10 could maintain the relationship and bit map tables.

In summary, preferred embodiments in accordance with the present invention provide a system for copying data sets from a first storage device to a second storage device. The first storage device is managed by a first controller and the second storage device is managed by a second controller. The first controller receives a command to copy a plurality of data sets from the first storage device to the second storage device. First and second data structures are generated to include fields corresponding to the data sets. The fields initially indicate that the data sets have not been copied. For the data sets subject to the copy command, the first controller transfers a copy of the data set to the second controller. The second controller stores the copy of the data set received from the first controller in the second storage device. The field in the first data structure corresponding to the data set copied to the second storage device is then modified to indicate that the data set was copied to the second storage device. The field in the second data structure corresponding to the data set the second controller stores in the second storage device is also modified to indicate that the data set was stored in the second storage device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of copying data sets from a first storage device to a second storage device, wherein the first storage device is managed by a first controller and the second storage device is managed by a second controller, comprising:
   receiving a command with the first controller to copy a plurality of data sets from the first storage device to the second storage device;
   generating first and second data structures including fields corresponding to the data sets and indicating in the fields that the data sets have not been copied; and
   for the data sets subject to the command, performing:
      (i) transferring a copy of the data set from the first controller to the second controller;
      (ii) storing with the second controller the copy of the data set received from the first controller in the second storage device;
      (iii) modifying the field in the first data structure corresponding to the data set copied to the second storage device to indicate that the data set was copied to the second storage device; and
      (iv) modifying the field in the second data structure corresponding to the data set the second controller stores in the second storage device to indicate that the data set was stored in the second storage device,
   wherein the first controller generates the first data structure and modifies the first data structure, and wherein the second controller generates the second data structure and modifies the second data structure.

2. The method of claim 1, wherein the first and second data structures are bit map tables, wherein for the data sets subject to the command there are addressable locations in the first and second data structures, wherein the step of generating the first and second data structures comprises setting the addressable locations to a first value, wherein the step of modifying the field in the first data structure corresponding to the data set copied to the second storage device comprises setting the addressable location in the first data structure corresponding to the data set copied to a second value, and wherein the step of modifying the field in the second data structure corresponding to the data set stored in the second storage device comprises the step of setting the addressable location in the second data structure corresponding to the data set copied to the second storage device to the second value.

3. A method of copying data sets from a first storage device to a second storage device, wherein the first storage device is managed by a first controller and the second storage device is managed by a second controller, comprising of:
   receiving a command with the first controller to copy a range of sequential data sets from the first storage device to the second storage device;
   generating a first data structure comprising:
      (i) generating a first field indicating a location in the first storage device of the first data set in the sequence; and
      (ii) generating a pointer indicating a data set in the first extent to copy from the first storage device to the second storage device, wherein the first controller processes the first field and pointer to determine a data set to copy to the second controller, and wherein the pointer is incremented after transferring the copy of the data set to the second controller; and
   generating a second data structure comprising:
      (i) generating a first field indicating a location in the second storage device of where to store the first data set in the sequence; and
      (ii) generating a pointer indicating a location in the second storage device to store data received from the first storage device, wherein the second controller processes the first field and pointer to determine the location in the second storage device where to store the data set received from the first controller, and wherein the pointer is incremented after storing the data set in the second storage device;
   for the data sets subject to the command, performing:
      (i) transferring a copy of the data set from the first controller to the second controller;
      (ii) storing with the second controller the copy of the data set received from the first controller in the second storage device;
      (iii) modifying the field in the first data structure corresponding to the data set copied to the second storage device to indicate that the data set was copied to the second storage device; and
      (iv) modifying the field in the second data structure corresponding to the data set the second controller stores in the second storage device to indicate that the data set was stored in the second storage device.

4. The method of claim 1, further comprising the steps of:
   receiving with the second controller a request from a host system for a data set in the second storage device;
   processing with the second controller the second data structure to determine whether the requested data set was copied from the first storage device to the second storage device;
   retrieving with the second controller the requested data set and transmitting the requested data set to the host system after determining that the requested data set was copied from the first storage device to the second storage device; and
   after determining that the requested data set was not copied from the first storage device to the second storage device, performing the steps of:
      (i) generating a message with the second controller to the first controller requesting the requested data set;
      (ii) transmitting the message to the first controller;
      (iii) accessing with the first controller the data set requested by the second controller in the message and transferring the requested data set to the second controller in response to processing the message;
      (iv) storing with the second controller the requested data set received from the first controller in the second storage device; and
      (v) transmitting to the host system with the second controller the requested data set after receiving the requested data set from the first controller.

5. The method of claim 4, further including the steps of:

modifying the field in the first data structure corresponding to the requested data set transferred to the second controller to indicate that the requested data set was copied to the second storage device; and modifying the field in the second data structure corresponding to the requested data set stored in the second storage device to indicate that the requested data set was copied to the second storage device.

6. The method of claim 1, further comprising the steps of:

receiving with the first controller an update to a data set in the first storage device;

processing with the first controller the first data structure to determine whether the data set to update was copied from the first storage device to the second storage device;

storing with the first controller the update to the data set in the first storage device after determining that the data set to update was copied from the first storage device to the second storage device; and after determining that the data set to update was not copied from the first storage device to the second storage device, performing the steps of:
  (i) accessing with the first controller the data set to update from the first storage device;
  (ii) transferring the accessed data set to the second controller;
  (iii) storing with the second controller the data set received from the first controller in the second storage device; and
  (iv) storing with the first controller the update in the first storage device.

7. The method of claim 6, further including the steps of:

modifying the field in the first data structure corresponding to the data set to update transferred to the second controller to indicate that the data set was copied to the second storage device; and modifying the field in the second data structure corresponding to the data set to update to indicate that the data set was copied to the second storage device.

8. A system for copying data sets, comprising:

a first controller;

a first storage device managed by the first controller capable of storing data sets;

a second controller;

a second storage device managed by the second storage controller capable of storing data sets;

a network communication line providing data communication between the first controller and the second controller;

a first memory device for storing data for access by the first controller, including a first data structure stored in the first memory device, wherein the first data structure includes fields corresponding to the data sets, wherein the data fields indicate whether the data sets were copied from the first storage device to the second storage device, and wherein the first controller processes the first data structure to determine whether a data set was copied from the first storage device to the second storage device; and a second memory device for storing data for access by the first controller, including a second data structure stored in the second memory device, wherein the second data structure includes fields corresponding to the data sets, wherein the data fields indicate whether the data sets were copied from the first storage device to the second storage device, and wherein the second controller processes the second data structure to determine whether a data set was copied from the first storage device to the second storage device, wherein the first controller generates the first data structure and modifies the first data structure, and wherein the second controller generates the second data structure and modifies the second data structure.

9. The computer system of claim 8, wherein the first and second data structures are bit map tables, wherein the data structures include an addressable location for the data sets subject to the command, wherein the first controller sets the addressable locations in the first data structure to a first value indicating that the data sets have not been copied from the first storage device to the second storage, wherein the first controller sets an addressable location to a second value indicating that a copy of the data set was transferred from the first storage device to the second controller, wherein the second controller sets the addressable locations in the second data structure to the first value indicating that the data sets have not been copied from the first storage device to the second storage device, and wherein the second controller sets an addressable location to the second value indicating that a copy of the data set transferred from the first controller was stored in the second storage device.

10. The computer system of claim 8, wherein the network communication line is a high speed transmission line and wherein the first controller and first storage device are in a first location and the second controller and second storage device are in a second location, wherein the first location and second location are separated by a distance of at least one mile.

11. A system for copying data sets, comprising:

a first controller;

a first storage device managed by the first controller capable of storing data sets;

a second controller;

a second storage device managed by the second storage controller capable of storing data sets;

a network communication line providing data communication between the first controller and the second controller;

a first memory device for storing data for access by the first controller, including a first data structure stored in the first memory device, wherein the first data structure includes fields corresponding to the data sets, wherein the data fields indicate whether sequential data sets were copied from the first storage device to the second storage device, and wherein the first controller processes the first data structure to determine whether a data set from sequential data sets was copied from the first storage device to the second storage device; and a second memory device for storing data for access by the first controller, including a second data structure stored in the second memory device, wherein the second data structure includes fields corresponding to the data sets, wherein the data fields indicate whether the sequential data sets were copied from the first storage device to the second storage device, and wherein the second controller processes the second data structure to determine whether a data set from, sequential data sets was copied from the first storage device to the second storage device;

wherein the first data structure stored in the first memory includes:

(i) a first field indicating a location in the first storage device of the first data set in the sequence;

(ii) a pointer indicating a data set in the first extent to copy from the first storage device to the second storage device, wherein the first controller processes the first field and pointer to determine a data set to copy to the second controller, and wherein the pointer is incremented after transferring the copy of the data set to the second controller; and wherein the second data structure stored in the second memory includes:

(i) a first field indicating a location in the second storage device of where to store the first data set in the sequence; and (ii) a pointer indicating a location in the second storage device of where to store data received from the first storage device, wherein the second controller processes the first field and pointer to determine the location in the second storage device of where to store the data set received from the first controller, and wherein the pointer is incremented after storing the data set in the second storage device.

12. The computer system of claim 8, further comprising: second controller logic for causing the second controller to:

(i) process a request from a host system for a data set in the second storage device;

(ii) process the second data structure to determine whether the requested data set was copied from the first storage device to the second storage device;

(iii) retrieve the requested data set and transmit the requested data set to the host system after determining that the requested data set was copied from the first storage device to the second storage device;

(iv) generate a message with the second controller to the first controller requesting the requested data set after determining that the requested data set was not copied from the first storage device to the second storage device;

(v) transmit the message to the first controller;

(vi) store with the second controller the data set requested in the message received from the first controller in the second storage device; and (vii) transmit to the host system the requested data set after receiving the requested data set from the first controller; and first controller logic for causing the first controller to process the message from second controller and access the data set requested by the second controller in the message and transferring the requested data set to the second controller in response to processing the message.

13. The computer system of claim 12, wherein the first controller logic further causes the first controller to modify the field in the first data structure corresponding to the requested data set transferred to the second controller to indicate that the requested data set was copied to the second storage device, and wherein the second controller logic further causes the second controller to modify the field in the second data structure corresponding to the requested data set stored in the second storage device to indicate that the requested data set was copied to the second storage device.

14. The computer system of claim 8, further comprising: first controller logic for causing the first controller to:

(i) receive an update to a data set at a location in the first storage device;

(ii) process the first data structure to determine whether the data set to update was copied from the first storage device to the second storage device;

(iii) store the update to the data set in the location in the first storage device after determining that the data set to update was copied from the first storage device to the second storage device;

(iv) access the data set in the location in the first storage device prior to the update to the data set after determining that the data set to update was not copied from the first storage device to the second storage device;

(v) transfer the accessed data set to the second controller;

(vi) store the update to the data set in the location in the first storage device after transferring the accessed data set to the second controller; and second controller logic for causing the second controller to store the accessed data set received from the first controller in the second storage device.

15. The computer system of claim 14, wherein the first controller logic further causes the first controller to modify the field in the first data structure corresponding to the data set to update transferred to the second controller to indicate that the data set to update was copied to the second storage device, and wherein the second controller logic further causes the second controller to modify the field in the second data structure corresponding to the data set to update to indicate that the data set to update was copied to the second storage device.

16. A first memory and second memory for storing data for access by a first controller and second controller, wherein the first controller processes data in the first memory to copy data sets from a first storage device to the second controller, and wherein the second controller processes data in the second memory to store data sets received from the first controller in a second storage device, comprising:

a first data structure stored in the first memory, including addressable locations corresponding to the data sets, wherein the addressable locations indicate whether the data sets were copied from the first storage device to the second storage device, and wherein the first controller processes the first data structure to determine whether a data set was copied from the first storage device to the second storage device; and a second data structure stored in the second memory, including addressable locations corresponding to the data sets, wherein the addressable locations indicate whether the data sets were copied from the first storage device to the second storage device, and wherein the second controller processes the second data structure to determine whether a data set was copied from the first storage device to the second storage device, wherein the first controller generates the first data structure and modifies the first data structure, and wherein the second controller generates the second data structure and modifies the second data structure.

17. The first and second memories of claim 16, wherein the first and second data structures are bit map tables, wherein the first controller sets the addressable locations in the first data structure to a first value indicating that the data sets have not been copied from the first storage device to the second storage, wherein the first controller sets an addressable location to a second value indicating that a copy of the data set was transferred from the first storage device to the second controller, wherein the second controller sets the addressable locations in the second data structure to the first value indicating that the data sets have not been copied from the first storage device to the second storage device, and wherein the second controller sets an addressable location to the second value indicating that a copy of the data set transferred from the first controller was stored in the second storage device.

18. A first memory and second memory for storing data for access by a first controller and second controller, wherein the first controller processes data in the first memory to copy sequential data sets from a first storage device to the second controller, and wherein the second controller processes data in the second memory to store the sequential data sets received from the first controller in a second storage device, comprising:

a first data structure stored in the first memory including addressable locations corresponding to the data sets, wherein the addressable locations indicate whether the data sets were copied from the first storage device to the second storage device, wherein the first controller processes the first data structure to determine whether a data set was copied from the first storage device to the second storage device, and further including:
(i) a first field indicating a location in the first storage device of the first data set in the sequence;
(ii) a pointer indicating a data set in the first extent to copy from the first storage device to the second storage device, wherein the first controller processes the first field and pointer to determine a data set to copy to the second controller, and wherein the pointer is incremented after transferring the copy of the data set to the second controller; and a second data structure stored in the second memory, including addressable locations corresponding to the data sets, wherein the addressable locations indicate whether the sequential data sets were copied from the first storage device to the second storage device, wherein the second controller processes the second data structure to determine whether a data set was copied from the first storage device to the second storage device, and further including:
(i) a first field indicating a location in the second storage device of where to store the first data set in the sequence; and
(ii) a pointer indicating a location in the second storage device of where to store data received from the first storage device, wherein the second controller processes the first field and pointer to determine the location in the second storage device of where to store the data set received from the first controller, and wherein the pointer is incremented after storing the data set in the second storage device.

19. Code implemented in a computer readable medium for causing a first and second controllers to copy data sets from a first storage device to a second storage device, wherein the first storage device is managed by the first controller and the second storage device is managed by the second controller, wherein the code is capable of causing at least one of the first controller and second controllers to perform:

receiving a command with the first controller to copy a plurality of data sets from the first storage device to the second storage device;
generating first and second data structures including fields corresponding to the data sets and indicating in the fields that the data sets have not been copied; and
for the data sets subject to the command, performing:
(i) transferring a copy of the data set from the first controller to the second controller;
(ii) storing with the second controller the copy of the data set received from the first controller in the second storage device;
(iii) modifying the field in the first data structure corresponding to the data set copied to the second storage device to indicate that the data set was copied to the second storage device; and
(iv) modifying the field in the second data structure corresponding to the data set the second controller stores in the second storage device to indicate that the data set was stored in the second storage device,
wherein the first controller generates the first data structure and modifies the first data structure, and wherein the second controller generates the second data structure and modifies the second data structure.

20. The code of claim 19, wherein the first and second data structures are bit map tables, wherein for the data sets subject to the command there are addressable locations in the first and second data structures, wherein the step of generating the first and second data structures comprises setting the addressable locations to a first value, wherein the step of modifying the field in the first data structure corresponding to the data set copied to the second storage device comprises setting the addressable location in the first data structure corresponding to the data set copied to a second value, and wherein the step of modifying the field in the second data structure corresponding to the data set stored in the second storage device comprises the step of setting the addressable location in the second data structure corresponding to the data set copied to the second storage device to the second value.

21. Code implemented in a computer readable medium for causing a first and second controllers to copy data sets from a first storage device to a second storage device, wherein the first storage device is managed by the first controller and the second storage device is managed by the second controller, wherein the code is further capable of causing at least one of the first controller and second controllers to perform:

receiving a command with the first controller to copy a range of sequential data sets from the first storage device to the second storage device;
generating a first data structure comprising:
(i) generating a first field indicating a location in the first storage device of the first data set in the sequence; and
(ii) generating a pointer indicating a data set in the first extent to copy from the first storage device to the second storage device, wherein the first controller processes the first field and pointer to determine a data set to copy to the second controller, and wherein the pointer is incremented after transferring the copy of the data set to the second controller; and
generating a second data structure comprising:
(i) generating a first field indicating a location in the second storage device of where to store the first data set in the sequence; and
(ii) generating a pointer indicating a location in the second storage device to store data received from the first storage device, wherein the second controller processes the first field and pointer to determine the location in the second storage device where to store the data set received from the first controller, and wherein the pointer is incremented after storing the data set in the second storage device;
for the data sets subject to the command, performing:
(i) transferring a copy of the data set from the first controller to the second controller;
(ii) storing with the second controller the copy of the data set received from the first controller in the second storage device;

(iii) modifying the field in the first data structure corresponding to the data set copied to the second storage device to indicate that the data set was copied to the second storage device; and (iv) modifying the field in the second data structure corresponding to the data set the second controller stores in the second storage device to indicate that the data set was stored in the second storage device.

22. The code of claim 19, wherein the code is further capable of causing at least one of the first controller and second controllers to perform:

receiving with the second controller a request from a host system for a data set in the second storage device;

processing with the second controller the second data structure to determine whether the requested data set was copied from the first storage device to the second storage device;

retrieving with the second controller the requested data set and transmitting the requested data set to the host system after determining that the requested data set was copied from the first storage device to the second storage device; and after determining that the requested data set was not copied from the first storage device to the second storage device, performing the steps of:
  (i) generating a message with the second controller to the first controller requesting the requested data set;
  (ii) transmitting the message to the first controller;
  (iii) accessing with the first controller the data set requested by the second controller in the message and transferring the requested data set to the second controller in response to processing the message;
  (iv) storing with the second controller the requested data set received from the first controller in the second storage device; and
  (v) transmitting to the host system with the second controller the requested data set after receiving the requested data set from the first controller.

23. The code of claim 22, wherein the code is further capable of causing at least one of the first controller and second controllers to perform:

modifying the field in the first data structure corresponding to the requested data set transferred to the second controller to indicate that the requested data set was copied to the second storage device; and modifying the field in the second data structure corresponding to the requested data set stored in the second storage device to indicate that the requested data set was copied to the second storage device.

24. The code of claim 19, wherein the code is further capable of causing at least one of the first controller and second controllers to perform:

receiving with the first controller an update to a data set in the first storage device;

processing with the first controller the first data structure to determine whether the data set to update was copied from the first storage device to the second storage device;

storing with the first controller the update to the data set in the first storage device after determining that the data set to update was copied from the first storage device to the second storage device; and after determining that the data set to update was not copied from the first storage device to the second storage device, performing the steps of:
  (i) accessing with the first controller the data set to update from the first storage device;
  (ii) transferring the accessed data set to the second controller;
  (iii) storing with the second controller the data set received from the first controller in the second storage device; and
  (iv) storing with the first controller the update in the first storage device.

25. The code of claim 24, wherein the code is further capable of causing at least one of the first controller and second controllers to perform:

modifying the field in the first data structure corresponding to the data set to update transferred to the second controller to indicate that the data set was copied to the second storage device; and modifying the field in the second data structure corresponding to the data set to update to indicate that the data set was copied to the second storage device.

* * * * *

UNITED STATES PATENT AND TRADEMARK OFFICE
CERTIFICATE OF CORRECTION

PATENT NO. : 6,189,079 B1
DATED : February 13, 2001
INVENTOR(S) : William Frank Micka and Yoram Novick It is certified that error appears in the above-identified patent and that said Letters Patent is hereby corrected as shown below:

Column 6,
Line 67, delete "shaded" and insert -- darker --.

Column 7,
Line 4, after the second occurrence of the term "DASD" insert -- 20 --.
Line 5, delete "shaded" and insert -- darker --.

Signed and Sealed this

Twenty-seventh Day of September, 2005

JON W. DUDAS
*Director of the United States Patent and Trademark Office*